J. H. ALANDAR.
RAILWAY SIGNAL APPARATUS.
APPLICATION FILED MAR. 7, 1910.
1,027,230.
Patented May 21, 1912.
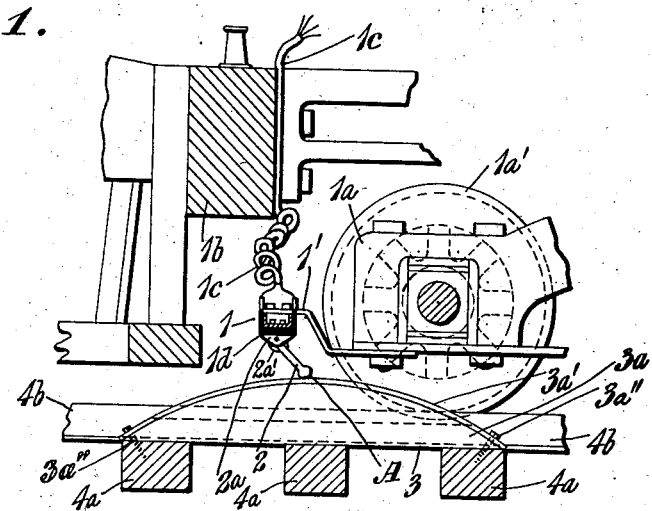
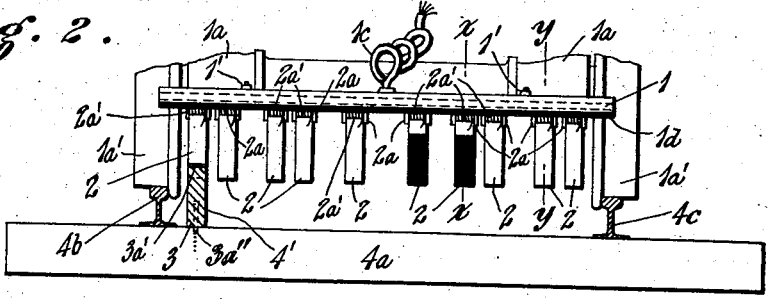
WITNESSES:
INVENTOR.
Joseph H. Alandar
BY Joseph T. Harrison
ATTORNEY.
COLUMBIA PLANOGRAPH CO., WASHINGTON, D. C.

UNITED STATES PATENT OFFICE.

JOSEPH H. ALANDAR, OF CHICAGO, ILLINOIS.

RAILWAY SIGNAL APPARATUS.

1,027,230.  Specification of Letters Patent.  Patented May 21, 1912.

Application filed March 7, 1910. Serial No. 547,773.

*To all whom it may concern:*

Be it known that I, JOSEPH H. ALANDAR, a citizen of the United States, residing at Chicago, in the county of Cook and State of Illinois, have invented certain new and useful Improvements in Railway Signal Apparatus, of which the following is a specification.

My invention relates to electrically operated signal apparatus and the object is to provide a system of apparatus to be used in conjunction with the track and the rolling stock of a railway, whether it be an interurban steam railroad or elevated or other railroad operating upon a private right-of-way, or an electric railroad of a similar nature, for transmitting signals to the operator on the locomotive, car or other vehicle running upon the track, to inform the operator of conditions existing along the track both in the direction in which the vehicle is traveling and to the rear thereof, and thereby guard against accidents such as collisions and derailments, as well as to transmit any other signals desired, which may be arranged for in installing the apparatus.

My invention consists in the details of construction and arrangement, as will hereinafter be more fully described and claimed.

In the drawings: Figure 1 is a sectional elevation of part of the forward truck and pilot of a locomotive with the contact members mounted thereon, together with part of the track and one of the contact members thereon. Fig. 2 is a cross sectional elevation of part of the track and the forward truck of the locomotive with the contact members thereon, and the contact member on the track. Fig. 3 is a vertical section on a line corresponding to the line x—x of Fig. 2, illustrating the construction of one of the contact members on the vehicle adapted to make electrical connection by contact on one side only. Fig. 4 is a vertical section on a line corresponding to the line y—y of Fig. 2, showing the construction of one of said contact members adapted to make electrical connection on either side. Fig. 5 is a front elevation of the side of one of said members that is adapted to make electrical connection upon contact with a contact member on the track, as shown at A in Fig. 1.

As illustrated herein, the installation of my improved signaling apparatus involves the attachment of a contact board 1, by means of a brace or extension 1′, to the forward end of the forward or pony truck 1$^a$ of the locomotive, in front of the truck wheels 1$^{a'}$ under the pilot 1$^b$. A suitable conduit 1$^c$ is attached to the pilot and is flexibly connected to the contact board 1, for carrying the connecting wires from the contact board 1 to the cab of the locomotive. This contact board 1 thus mounted extends transversely of the track, and has a series of contact plates 2 mounted on it at intervals across the track by means of hinged brackets 2$^a$, provided with springs 2$^{a'}$, so that the contact plates 2 may swing in either direction longitudinally of the track against the pressure of the springs 2$^{a'}$ but will normally be held in a depending vertical position by the pressure of said springs. As illustrated, each contact member comprises a middle plate 2$^b$ that forms the support of and stiffens and insulating base 2$^{b'}$ upon which is mounted the contact plate 2$^{b''}$. The middle plate 2$^b$ may be of steel to give the required strength to the contact member, while the base 2$^{b'}$ may be of fiber, and the contact plate 2$^{b''}$ may be of brass or other metal adapted to make an efficient electrical contact.

The plate 2$^{b''}$ is provided with a rib 2$^{b'''}$ running across its lower end to present an angle of contact of the plate with the track contact member 3 to insure an efficient scraping engagement that will keep the track contact clean and allow the proper electrical connection. The plate 2$^{b''}$ does not extend to the extreme lower end of the insulating base 2$^{b'}$ and this insulating base surrounds the lower end of the middle rib 2$^b$ and is rounded at its end. Constructed in this manner the engagement of the plate 2$^{b''}$ with the track contact member will be effectually prevented when the locomotive approaches the contact with the insulated side of the contact plate presented, and if it approaches with the contact side presented electrical contact will be made with the rib 2$^{b'''}$ of the plate. When the plate is to make contact on both sides insulation of the plates 2$^{b''}$ on the two sides is not necessary, but the contact member illustrated in Fig. 4 has the insulating base 2$^{b'}$ included, since the insulating fiber forms a cushion to the parts, making the contact members better able to withstand the impact when they strike the track contact members. In either case the lower extremity of the contact member is given such a shape by the rounding of the lower end of the insulating base 2$^{b'}$ and by the formation of the ribs 2$^{b'''}$ on the adjacent ends of the contact plates, that the contact member will slide over the track contact member 3, which is of a segmental shape and presents its arc-shaped edge for contact of the member 2. It is important that the member 2 slide over the contact member 3 whether presented to its surface endwise or whether it drags over the surface of the member 3 as at A in Fig. 1. Thus the locomotive might stop with the member 2 descending the sloping surface of the member 3 and start backward, upon which the member 2 would be presented endwise, and unless rounded would bind and cause damage to itself and the other parts of the apparatus. The contact plates 2$^{b''}$ are riveted through the insulating base to the middle plate 2$^b$, and they connect electrically with the hinged bracket 2$^a$ through the middle plate 2$^b$ as well as through the spring 2$^{a'}$ which bears against the contact plates 2$^{b''}$ under their upper ends and in their relative movement therewith serve to maintain scraped contacts.

The hinged brackets 2$^a$ are attached to the contact board 1 through an insulating slab 1$^d$ on the under surface of the board 1, which contact board preferably is of steel. Wires connect to the various brackets 2$^a$, and lead up through the conduit 1$^c$.

The contact plates 3 on the track, as shown, consist in segment shaped wooden blocks 3$^a$ placed longitudinally of the track and faced on their curved upper edges with metal plates 3$^{a'}$, which are preferably of brass. These contact members thus constructed are secured to the cross ties 4$^a$ parallel to the rails 4$^b$ and 4$^c$ of the track by means of lag screws 3$^{a''}$.

Any suitable system of track and vehicle wiring may be used, and any vehicle adapted to run on the rails may have my improved contact members attached in position to make contact with any corresponding track contact members along the road, by arranging them according to a proper system, and any of the signals desired may be obtained by providing the vehicle with suitable apparatus adapted to be operated by a momentary current.

Having fully described my invention, what I claim as new and desire to secure by Letters Patent is:

1. In railway signal apparatus, the combination with a track and a vehicle running on the track, of a contact on the track having a surface presented for electrical connection in either direction along the track, and a contact on the vehicle having a surface to make electrical connection with the track contact presented in one direction and having a surface to make insulated engagement with the track contact presented in the other direction.

2. In railway signal apparatus, the combination with a track having various contacts, and a vehicle running on the track, of contacts on said vehicle insulated from each other, to electrically connect with the respective track contacts when the vehicle runs in one direction, but having insulated means to engage with the respective track contacts when the vehicle runs in the other direction.

3. In railway signal apparatus, a bracket rigidly secured to a vehicle and insulated therefrom, a middle rib hinged to the bracket, an insulating base mounted on the rib, a contact plate mounted on the insulating base and electrically connected to the rib and to the bracket, and a spring secured in the bracket having a member engaging on one side of said rib and a member engaging on the other side thereof, whereby the contact is held in depending position but is allowed to yield and swing on its hinged connection with the bracket.

4. In railway signal apparatus, a bracket mounted on a foundation and insulated therefrom, a middle rib hinged to the bracket, an insulating base mounted on the rib, a contact plate mounted on the insulating base and electrically connected to the rib and to the bracket, and a spring secured in the bracket having a member engaging on one side of said rib and a member engaging on the other side thereof, whereby the contact is held in engaging position but is allowed to yield and swing on its hinged connection with said bracket, said contact plate being presented for engagement on one side of said contact, but said insulating base only being presented for engagement on the other side of said contact.

5. In railway signal apparatus, a hinged middle rib and an insulating base mounted on said rib, covering both sides and the free end of the rib, and a contact plate mounted on said insulating base on one side of said rib, said insulating base being convex where it covers the end of the rib and said contact plate having an extension adjacent said convex part of the base substantially continuous therewith, said insulating base alone being exposed on the other side of said rib.

JOSEPH H. ALANDAR.

Witnesses:
 CLARENCE PERDEW,
 JOSEPH T. HARRISON.